United States Patent [19]

Kaga et al.

[11] 4,444,391

[45] Apr. 24, 1984

[54] TEACHING TOY WITH STOP ACTION

[75] Inventors: Takashi Kaga; Yoshiaki Funakoshi, both of Tokyo, Japan

[73] Assignee: Tomy Kogyo Co., Inc., Japan

[21] Appl. No.: 377,814

[22] Filed: May 13, 1982

[30] Foreign Application Priority Data

May 14, 1981 [JP] Japan .............................. 56-69731[U]

[51] Int. Cl.³ .............................................. A63F 1/18
[52] U.S. Cl. .................................. 273/1 GE; 434/352
[58] Field of Search ................ 273/1 R, 1 GE, 1 GC; 434/352

[56] References Cited

U.S. PATENT DOCUMENTS

| 2,562,179 | 7/1951 | Dorf | 434/352 |
| 2,654,163 | 10/1953 | Reynolds | 434/352 |
| 3,118,236 | 1/1964 | Van Hemel | 434/352 |
| 3,339,921 | 9/1967 | Glass et al. | 273/1 GE |
| 3,471,148 | 10/1969 | Janiszewski et al. | 273/1 GE |
| 3,763,577 | 10/1973 | Goodson | 434/352 |
| 3,865,367 | 2/1975 | Breslow et al. | 273/1 GC |
| 3,949,986 | 4/1976 | Breslow | 273/1 R |

Primary Examiner—William H. Grieb
Attorney, Agent, or Firm—K. H. Boswell; Edward D. O'Brian

[57] ABSTRACT

A teaching toy has a stop action feature which allows operators of the toy to momentarily stop the action of the toy in order for one of the operators to make a guess as to a question which is being asked by the toy. The teaching toy includes a housing with at least two operator interface members located on the housing. A control mechanism is located in the housing in association with each of the operator interface members. Each of the operator interface members are capable of independently interacting with the control mechanism such that as soon as a first of the operator interface members interacts with the control mechanism, further interaction with subsequent operator interface members is prevented. Interaction of one of the operator interface members with the control mechanism controls the output of an output mechanism which displays a card or the like utilized in a learning process. A reset mechanism is associated with the control mechanism for resetting the control mechanism after interaction with one of the operator interface members.

11 Claims, 15 Drawing Figures

TEACHING TOY WITH STOP ACTION

BACKGROUND OF THE INVENTION

This invention is directed to a toy capable of being utilized in a teaching manner wherein a plurality of operators of the toy each operate an operator button in order to determine who is first to get the meaning or basis of an indicia card ejected from the toy. The toy includes a mechanism which differentiates between which operator of the toy first activated his interface mechanism to stop further display of the indicia on the card or the like.

Parents, educators and the like are aware that a toy which can incorporate a teaching function therein will provide not only entertainment of a child operating the same, but assist in concurrent learning by the child while the child uses the toy. Children, on the other hand, will not tend to play with a toy for any length of time if the toy is not constructed such that it can maintain their interest and be stimulating to them over a long period of time. Flash cards and the like are known wherein certain indicia which is to be learned are located on the flash cards. These flash cards can then be used in conjunction with guessing games wherein the user of the flash card tries to guess an answer to the indicia located on the flash card. This usually requires two parties to use, one to control the flash cards, and the second party to guess the contents thereon. While flash cards and the like are very useful in school settings and other organized situations, they do not find too much acceptance by children for use in play.

Most children are fascinated by guessing contests wherein one child tries to guess before another the answer to a question or the like. Controversy can arise however, when children are left on their own to play such a guessing game, in that squabbles inevitably ensue because one child thinks that they were first to guess, which is in conflict with another child's thinking along the exact same line.

In view of the above, it is considered that a toy which incorporates both a learning principle and a mechanism to determine which child out of a group of children first responded with an answer would be a very useful concept. It would provide both the aspects of utilizing flash cards and the like wherein different subject matters could be utilized to stimulate the child's learning, and a mechanism which would eliminate human determination as to who was aware of the answer first.

BRIEF DESCRIPTION OF THE INVENTION

In view of the above, it is a broad object of this invention to provide a learning toy which provides for a mechanism to allow for determination of which one of a group of children is first to know an answer, and further provides a mechanism which can automatically display indicia cards with questions thereon for which the children must supply answers. It is a further object of this invention to provide a toy which requires no external energy source such as batteries or the like, but is completely propelled by kid power alone. This allows for continued use of the toy independent of the necessity of providing outside energy use sources. It is a further object to provide a toy which, because of its simplicity of construction and engineering, will provide a long service life and will be available at an economical price to the consuming public.

These and other objects, as will become evident from the remainder of this specification are achieved in a toy which comprises a housing, at least two operator interface means located on said housing; a control means located on said housing and in operative association with each of said operator interface means, each of said operator interface means capable of independently interacting with said control means when said control means is in a first control mode and when a first of said operator interface means interacts with said control means said interaction between said first operator interface means and said control means shifting said control means from said first control mode to a second control mode and said shifting of said control means to said second control mode by said interaction with said first operator interface means preventing subsequent interaction between any other interface means with said control means; reset means operatively associated with said control means and capable of shifting said control means from said second control mode back to said first control mode; output means associated with said housing and operatively associated with said control means, said output means having a first output parameter and a second output parameter, said output means exhibiting said first output parameter in response to said control means being in said first control mode and said output means exhibiting said second parameter in response to said control means being in said second control mode.

In a preferred embodiment of the invention, a plurality of indicating means equal in number to the number of operator interface means is utilized. Each of the indicating means would be associated with one of the operator interface means with each of the indicating means capable of indicating if the operator interface means with which it is associated has interacted with the control means and shifted the control means from the first control mode to the second control mode. Furthermore, a plurality of inhibitor means, equal in number to the number of operator interface means would also be provided. Each of the inhibitor means would be operatively associated with one of the operator interface means and capable of inhibiting the operator interface means with which it is associated from interacting with the control means when the control means is in the second control mode. Further, a plurality of reset means equal in number to the number of operator interface means would be provided. Each of the reset means would be associated with one of the operator interface means such that if the operator interface means with which a particular reset means is associated was the first operator interface means to interact with the control means the respective reset means associated with the first operator interface means would be capable of shifting the control means from the second control mode back to the first control mode.

In the preferred embodiment of the invention, a plurality of indicator-reset elements equal in number to the number of operator interface means would be present. Each of the indicator-reset elements would be associated with both one of the operator interface means and one of the operator reset means. As such, each of the indicator-reset elements would be useful for both serving to indicate if the operator interface means with which it is associated was the operator interface means which interacted with the control means and for resetting the control means back from the second control mode to the first control mode after such an interaction.

Preferredly, the output means would include a drive means and a drive governing means. The drive means would be capable, in a first instance, of producing an output and, in a second instance, of producing no output. The governing means would be operatively associated with both the control means and the drive means such that when the control means is in the first control mode, the drive means would produce one of said output or said no output and when the control means is in the second control mode, the drive means would produce the other of said output or no output. In the illustrated embodiment of the invention, the drive means would produce the output when the control means was in the first control mode and the drive means would produce no output when the control means was in the second control mode. For the illustrative embodiment, at least one output element in an output housing would be present. The drive means would be located in the output housing with the output element capable of being associated with the output housing and movable with respect to the output housing. The drive means would be capable of moving the output element with respect to the output housing in response to output of said drive means and the output element would remain static with respect to the output housing in response to no output of said drive means.

BRIEF DESCRIPTION OF THE DRAWINGS

This invention will be better understood when taken in conjunction with the drawings wherein.

This invention utilizes certain principles and/or concepts as are set forth in the claims appended to this specification. Those skilled in the toy arts will realize that these principles and/or concepts are capable of being illustrated in a variety of illustrative embodiments different from the exact embodiment utilized for illustrative purposes herein. For this reason, this invention is not to be construed to being limited to the exact illustrated embodiment, but is to be construed only in light of the claims.

DETAILED DESCRIPTION OF THE INVENTION

Figure 1:
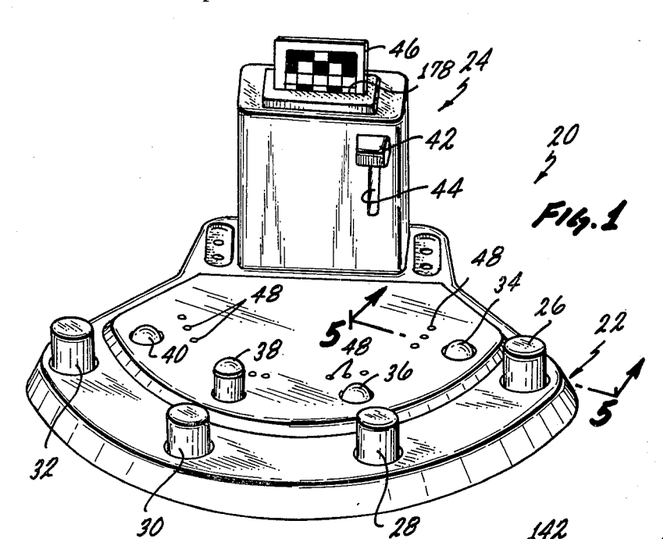
FIG. 1 is a front oblique view showing the preferred embodiment of the invention.

The toy 20 of the invention is shown in FIG. 1 as it would be utilized by a plurality of children playing the same. Before describing the mechanical components thereof, a brief description of its operation is believed in order, to better clarify understanding of the invention.

The toy 20 includes a base 22 with a vertical card dispenser 24 extending upwardly from the rear of the base 22. Located on the base 22 are 4 operator interface buttons 26, 28, 30 and 32. Located just adjacent to each of the operator interface buttons 26, 28, 30 and 32 are elements 34, 36 38 and 40. The elements 34, 36, 38 and 40 have a dual function, as will be evident shortly.

An activation button 42 on the card dispenser 24 is depressed vertically downward to the lowermost limits of its travel within its slot 44 by one of the children playing with the toy. This activates the card dispenser 24, and barring other operations as will be noted below, the activation button 42 then proceeds to slowly ride up within the slot 44 and, concurrently with this action, a card such as the card 46 is dispensed out of the card dispenser 24.

It is an object of the game for the children utilizing the toy 20 to attempt to first guess what is on the card 46. This may involve answering a question, or guessing what a particular word stands for, such as would be useful in teaching first graders and the like to spell, or other similar type data which would be useful in both a play and learning situation. In any event, when one of the children playing the game decides that he knows what, indeed, is the answer to the question or indicia in the card 46, he depresses his operator interface button 26, 28, 30 or 32. In the toy 20 as seen in FIG. 1, the operator button 30 has been depressed and the element 38 has popped up to indicate that it was the operator button 30 which was the button which was depressed. Upon depression of one of the operator interface buttons 26, 28, 30 or 32, the other remaining of these buttons are now inhibited from being depressed. Thus, only one of the buttons can be depressed, and the button that is depressed will have the corresponding element 34, 36, 38 or 40 raised with respect to the base 22. When the appropriate operator interface button, such as the button 30, is depressed, and the element 38 has popped up, movement of the card 46 and the button 42 in an upwardly direction stops, and the child then proceeds to answer the question or to render a guess as to what is asked with regard to the card 46. A plurality of holes, collectively identified by the numeral 48, are located over the surface of base 22 in front of each of the elements 34, 36, 38 and 40. These are utilized in conjunction with a series of flags (not shown or identified in the drawings) which can be used to indicate correct guesses, wrong guesses or the like, in what ever manner the children playing the game wish to score the same.

In any event, once the child, whose element 34, 36, 38 or 40 is popped up, has answered the question or responded to the card 46, the child then re-depresses the element button, such as the button 38, downwardly into the base 22, which again initiates the activation button 42 and the card 46 in an upward direction. The toy 20 is now ready for further guesses by all members of the game if, in fact, the original guess was wrong, or by exposure of a new card 46 from the card dispensing element 44 when the previous card has been totally dispensed. In any event, by continuously depressing the button 42, cards will be systematically dispensed from the card dispenser 24 and the children utilizing the toy 20 can stop action of the card 46 by depressing the appropriate operator interface buttons 26, 28, 30 or 32.

Figure 2:
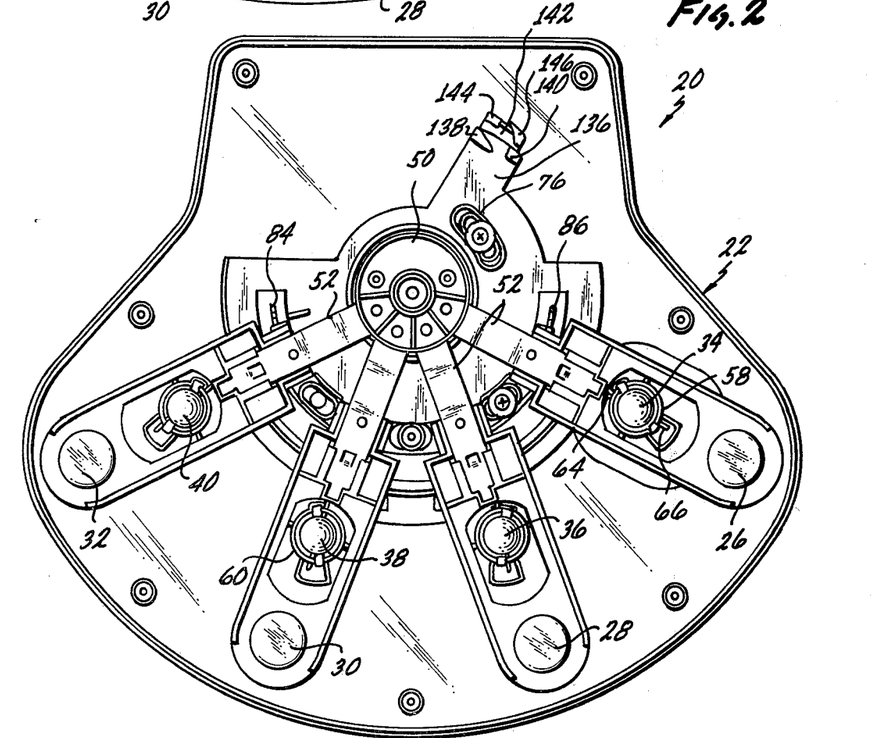
FIG. 2 is a top plan view of the embodiment of FIG. 1 with certain of the overlaying components removed to expose underlying components.
Figure 4:
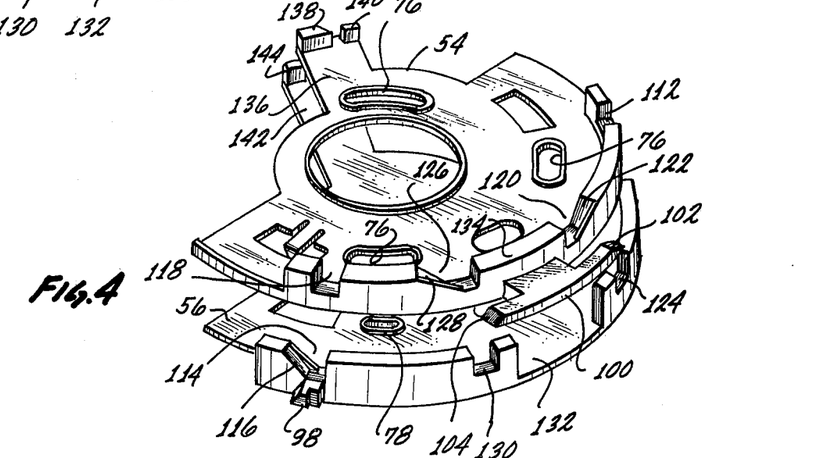
FIG. 4 is a exploded oblique view of the components as seen in FIG. 3.
Figures 10A, 10B:
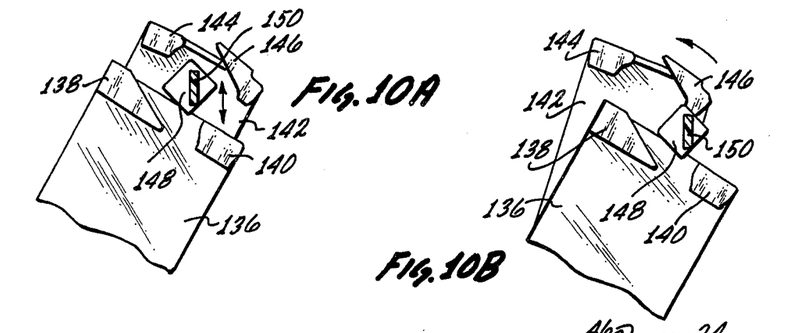
FIGS. 10A and 10B are top plan views of certain of the components of the invention showing in FIG. 10a free movement of one of these components with respect to the remainder of the components and in FIG. 10b inhibited movement of that same component with the remainder of the components.

In essence, the toy 20 incorporates two separate mechanical functions which are interconnected by the connections seen in FIGS. 10a and 10b. These two functions include those componensts located in the base 22 and those components located in the card dispenser 24. In FIG. 2 the cover of the base 22 has been removed to expose the components located therein. Each of the activation buttons 26, 28 30 and 32 are formed as part of an identical member collectively identified by the numeral 48. The members 48 are attached to a central upstanding boss 50 via flat springs collectively identified by the numeral 52. These hold the individual operator interface buttons 26, 28, 30 and 32 in an upward direction, such that they are exposed out of the base 22 as is seen in FIG. 1. The boss 50 further serves as a pivoting axle for two control members 54 and 56 as is best seen in FIG. 4. The two control members 54 and 56 stack one on top of the other and can rotate about boss 50 through a limited arcuate pathway.

The elements 34, 36, 38 and 40 are each located within a cage collectively identified by the numerals 58 for the elements 34 and 36, and 60 for the elements 38 and 40. The cages 58 and 60 differ from each other in that they are mirror images with respect to a vertical line of symmetry. In any event, understanding the function of one will render the function of the other obvious except for appropriate movement to the left in one and movement to the right in the other. Each of the elements 34, 36, 38 and 40 are appropriately upwardly biased within their respective cages 58 and 60 by a compression spring collectively identified by the numeral 62 and illustrated in FIG. 9. The elements 34, 36, 38 and 40 are limited with respect to their upward travel by the top of the housing 22 interacting with a front and rear tab 64 and 66 located on each of the respective elements 34, 36, 38 and 40. The tabs 64 and 66 are sized larger than the openings (not identified or numbered) through which the elements 34, 36, 38 and 40 extend upwardly through the base 22. This prevents complete ejection of the elements 34, 36, 38 or 40 from their appropriate cages 58 or 60 under the influence of the compression springs 62.

Each of the cages 58 and 60 contain a front slot 68 and a rear slot 70. The front tab 64 moves upwardly and downwardly within the front slot 68 and the rear tab 66 moves likewise within the rear slot 70. Each of the front and rear slots 68 and 70 include a dog leg collectively identified by the numeral 72 and best seen in FIG. 9. The upper surface 74 of the dog leg is slanted downwardly toward the appropriate slot, either 68 or 70, such that it is possible to lock the tabs 64 and 66 within the appropriate dog legs 72, fixedly holding the elements 34,36, 38 or 40 in a downward position within their respective cages 58 or 60. As was noted above, the cages 58 and 60 differ from each other in that one is a mirror image of the other. By rotating the elements 34 and 36 counterclockwise, as seen in FIG. 2, the appropriate tab 64 and 66 on these two elements 34 and 36 become locked within the dog leg 72 holding the elements 34 and 36 in the downward position. The elements 38 and 40 are held in the downward position by rotating them clockwise such that their appropriate tabs 64 and 66 become locked in the dog leg 72. Clockwise rotation of the elements 34 and 36 and counterclockwise rotation of the elements 38 and 40 free them from being held in their respective tabs 64 and 66 in the dog leg 72 such that they can move upwardly within the appropriate cages 58 and 60 under the bias of springs 62.

When each of the individual elements 34, 36 38 or 40 are depressed by one of the children playing with the toy 20, as the element is depressed, the front tab 64 abuts against a wedge 74 formed near the bottom of the front slot 68. The wedges 74 are appropriately located with respect to the cages 58 and 60 such that they cause further depression of the elements 34 and 36 in a downward manner to be accompanied by a counterclockwise rotation, while further depression of the elements 38 and 40 in a downward manner are accompanied by a clockwise rotation. This located the respective front and rear tabs 64 and 66 within the confines of the dog legs 72 such that when pressure is released on the top of the elements 34, 36, 38 and 40 by the child so depressing them, the springs 62 move the elements 34, 36, 38 and 40 upwardly, catching the front and rear tabs 64 and 66 within the appropriate dog leg 72 to lock the elements 34, 36, 38 and 40 in the downward position. Downward movement of the tabs 64 and 66 of one of the elements 34, 36, 38 or 40 also produces a movement in one of the control members 54 or 56 as hereinafter explained.

The control member 54 includes three arcuately shaped elongated slots collectively identified by the numeral 76. The control member 56 includes three arcuately shaped upstanding bosses collectively identified by the numeral 78. The bosses 78 are hollow. Bosses 78 fit within the slots 76 and together, the slots 76 and the bosses 78 fit over three bosses collectively identified by the numeral 80 which extend upwardly from the bottom 82 of the base 22. The elongated arcuately shaped slots 76 are oversized with respect to the elongated arcuately shaped bosses 78 such that the bosses 78 can move in a limited manner within the slot 76. Likewise, the interior of the bosses 76 are oversized with respect to the bosses 80 such that the bosses 76 can move with respect to the bosses 80. This allows for shifting of both of the control members 54 and 56 about the boss 50 with respect to the bosses 80.

Figure 7:
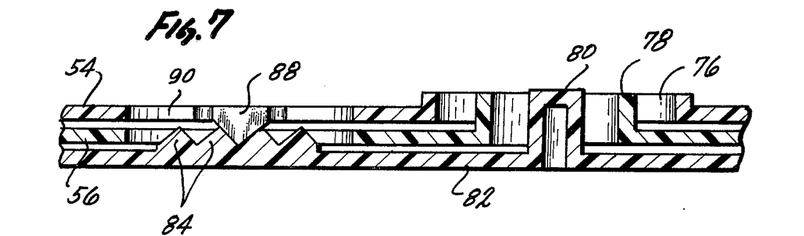
FIG. 7 is a side elevational view in section about the line 7—7 of FIG. 3.

Extending upwardly from the bottom surface 82 of the base 22 are a first set of control teeth 84 and a second set of control teeth 86. Both of these can be seen to a limited extent in top plan view of FIG. 2 with the first set of control teeth 84 shown in side elevation in FIG. 7. An arm 88 is located within an opening 90 in the control member 54. As seen in FIG. 7, the arm 88 is triangular in cross-section on its bottom surface and interacts with the first control teeth 84. There are four control teeth 84 and thus there are four triangular openings or tooth spaces in between the individual control teeth. This allows for three positions of the arm 88 with respect to these control teeth, which in turn allows for three positions of the control member 54 with respect to movement arcuately around the boss 50. In a similar manner arm 92 is formed as a part of control member 56 and is located in an opening 94 which extends through both control member 54 and control member 56. Both of the arms 92 and 88 are spring arms and are free to be lifted upwardly against their biases as they move across the appropriate control teeth 84 and 86. The arm 92 interacts with the second set of control teeth in a manner totally analogous to the manner in which the arm 88 acted with respect to the first set of control teeth 84. Interaction of the arm 92 with the control teeth 86 allows shifting of the control member 56 also through three positions with respect torotation about the boss 50. For the purpose of the remainder of this specification, it will be assumed that location of tha appropriate arms 88 and 92 in the center of the control teeth 84 and 86 will render both of the control members 54 and 56 in a neutral position. This position is as illustrated in FIG. 7 for the control member 54.

Both of the control members 54 and 56 can shift clockwise one position with respect to their neutral positions and counterclockwise one position with respect to the neutral position. The interaction of the respective arms 88 and 92 will then hold the control members 54 and 56 in these clockwise or counterclockwise shifted positions once shifted, because of the bias of the spring arms 88 and 92 interacting with the control teeth 84 and 86. Each of the operator interface buttons 26, 28, 30 and 32 are capable of shifting one or the other of the control members 54 or 56 in either a clockwise or a counterclockwise direction. Thus, for the two control members 54 and 56, there are four shiftable positions, that is, clockwise shifting of control member 54, counterclockwise shifting of control member 54, clockwise shifting of control member 56 and counterclockwise shifting of control member 56. Each of the elements 34, 36, 38 and 40 are likewise capable of causing one of the control members 54 or 56 to shift either clockwise or counterclockwise. The operator interface buttons 26, 28, 30 and 32 are related with the elements 34, 36, 38 and 40 such that if the operator interface button 26 shifts control member 56 counterclockwise, its associated element 34, upon being depressed, will shift the control member 56 clockwise. Likewise, a depression of the operator interface button 28 will shift control member 54 counterclockwise and depression of its associated element 36 will shift control member 54 clockwise, with depression of operator interface button 30 shifting control member 54 clockwise and depression of its associated element 38 shifting control member 54 counterclockwise, and, finally, depression of operator interface button 32 shifting control member 56 clockwise, with depression of element 40 shifting control member 56 counterclockwise.

Figure 3:
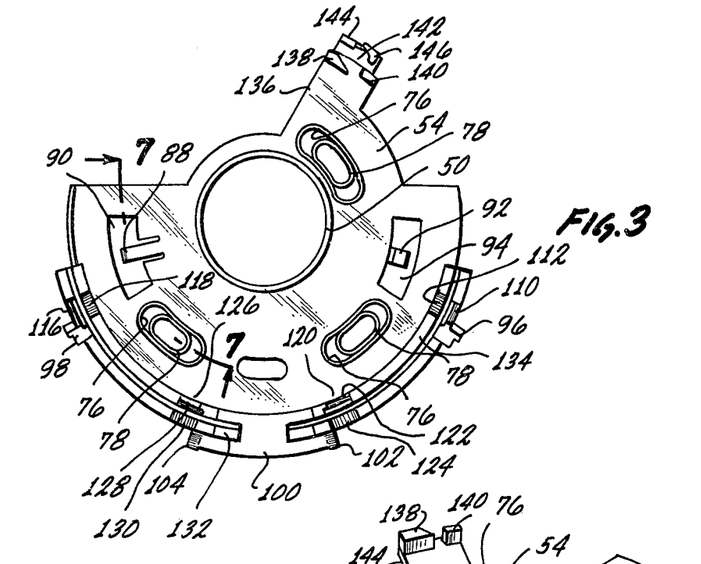
FIG. 3 is a top plan view of certain of the components illustrated in FIG. 2 with certain of the overlying components found in FIG. 2 removed for better clarity of the components underneath.

The above described actions are achieved as follows. A small wedge-shaped projection 96 projects outwardly on the right hand side of control member 56 as seen in FIG. 3, whereas a similar projection 98 projects from the left hand side of control member 56. The wedge shape on the projection 96 slants downwardly from left to right, while the wedge shape on the projection 98 slants downwardly from right to left. A forked arm 100 has a wedge-shaped end 102 and a similar wedge-shaped arm 104 on the other side. The wedge-shaped end 102 projects downwardly from left to right, while the wedge-shaped end 104 projects downwardly from right to left. The projection 96 can be seen in side section in phantom line in FIG. 9.

Figures 8, 9:
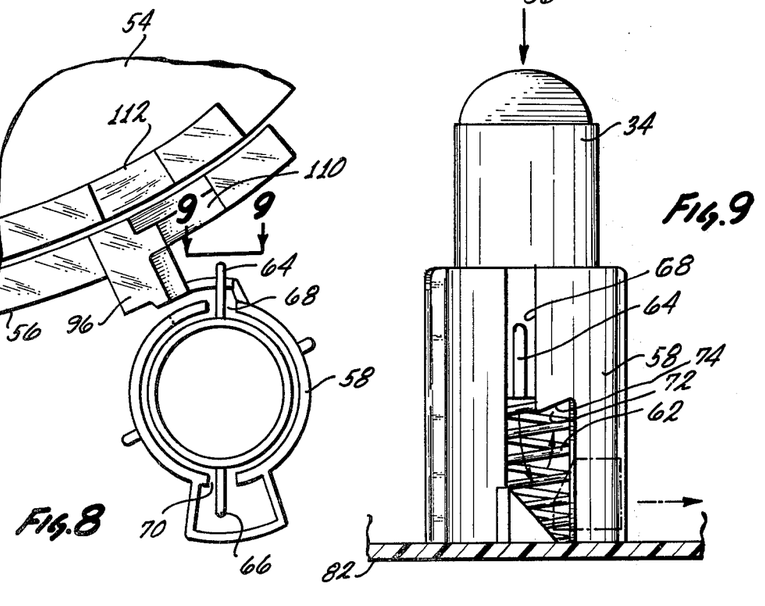
FIG. 8 is a top plan view showing the details of certain of the components of FIG. 5 with overlying components removed for clarity of the components lying underneath.
FIG. 9 is a side elevational view about the line 9—9 of FIG. 8 with a certain component laying in the foreground of those illustrateed in FIG. 9 shown in phantom lines to illustrate the interaction of the component of FIG. 9 with the phantom component.

The projections 96 and 98, and the ends of the arm 102 and 104 are so located with respect to cages 58 and 60 such that they can interact with the front tabs 64 located on the elements 34, 36, 38 and 40. If the element 34 is elevated as is seen in FIG. 9, and is depressed, its front tab 64 contacts the projection 96 and slides along its wedge-shaped edge as it concurrently engages the wedge 74. The movement to the right in FIG. 9 of the front tabs 64 as it moves down the wedge 74 further increases the thrust to the right of the projection 96. The projection 96 would be moved a sufficient amount to cause disengagement of the spring arm 92 from its location in the second control teeth 86 to move it one notch with respect to the second control teeth 86.

Figure 5:
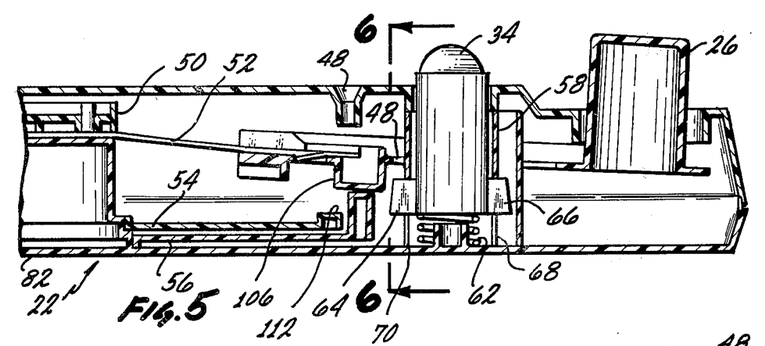
FIG. 5 is a side elevational view in partial section about the line 5—5 of FIG. 1.
Figure 6:
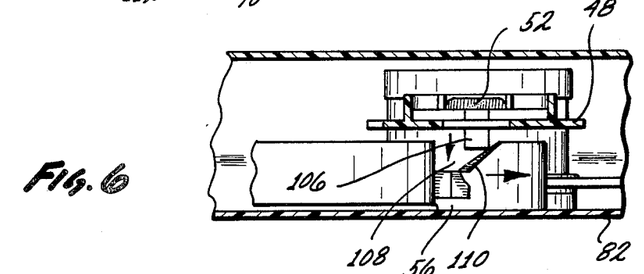
FIG. 6 is an elevational view on partial section about the lines 6—6 of FIG. 5.

Referring now to FIG. 5, it can be seen that the member 48 includes a downwardly projecting tab 106. Insofar as each of the operator interface buttons 26, 28, 30 and 32 include one of the members 48, each of these would also include one of the tabs 106.

Referring to FIGS. 3, 4, 5, 6 and 8, on the right hand side of control member 56 is a slot 108 having a wedged surface 110 which extends downwardly from right to left. The control member 54 includes a slot 112 which aligns with the slot 108. On the left hand side of the control member 56 is a slot 114 which has a wedge-shaped surface 116 which slants left to right, and the control member 54 includes a slot 118 which aligns with the slot 114 when control members 54 and 56 are both in a neutral position. The control member 54 in right center includes a slot 120 having a wedge-shaped surface 122 which slants right to left with control member 56 having a slot 124 which will align with the slot 120 when the two control members 54 and 56 are in their neutral positions. To the left center on control member 54 is a slot 126 having a wedge-shaped surface 128 and an appropriate aligning slot 130 in the control member 56, which, as before, aligns with slot 126 when both of the control members 54 and 56 are in the neutral position. The arm 100 on the control member 54 projects through a large slot 132 on the control member 56. There is enough area within the slot 132 for the arm 100 to move within the slot 132 without any contact between the arm 100 and the sides of the slot 132, no matter what position the two control members 54 and 56 are in.

When the operator interface button 26 is depressed, the tab 106 on its appropriate member 48 passes into the slots 108 and 112 and contacts the wedge-shaped surface 110. On contacting this surface, and with continued depression of the operator interface button 26, the tab 106 forces against the surface 110 causing the control member 56 to rotate counterclockwise about the boss 50. With counterclockwise rotation of the control member 56, the projection 96 engages the front tab 68 on the element 34, rotating the element 34 clockwise, which frees its respective tabs 64 and 66 from their dog leg 72 and allows the element 34 to lift up within the cage 58 such that the element 34 projects upwardly from the base 22 of the toy 20. Depression of the element 34 to reset the toy 20 results in interaction of the front tab 64 as previously explained against the projection 96 which rotates the control member 56 clockwise to reset it in its neutral position. With counterclockwise rotation of the control member 56, when the operator button 26 was depressed, the slots 124, 130 and 114 are no longer aligned underneath the respective tabs 106 on the members 48 connected to the operator interface buttons 26, 28, 30 and 32. Instead, the top surface of a flange 132, which extends around the edge of the control member 56 and is broken by the slots 108, 124, 132, 130 and 114, lays directly underneath the appropriate tab 106 located on the operator interface buttons 28, 30 and 32 and prevents depression of these interface buttons. Thus, it can be seen that with depression of the interface button 26, depression of the remaining interface buttons 28, 30 and 32 is prevented.

Likewise, upon depression of the operator interface button 32, its tab 106 interacts with wedge surface 116 rotating the control member 56 clockwise, which once again aligns the flange 132 underneath all of the remaining tabs 106 on the operator interface buttons 26, 28 and 30, preventing their depression. Concurrently with clockwise rotation of the control member 56, the projection 98 interacts with the element 40 causing the same to pop up above the base 22, indicating that it was the operator interface button 32 which was depressed. Resetting of the control member 56 by depression of the element 40 causes the element 40 to interact with the projection 98, rotating the control member 56 counterclockwise, once again aligning the slots 108, 124, 130 and 114 under each of the appropriate tabs 106 located on the respective operator interface buttons 26, 28, 30 and 32.

Upon depression of operator interface button 28, its tab 106 interacts with the wedge-shaped surface 112 in slot 120, causing counterclockwise rotation of control member 54. The end 102 of the arm 100 then interacts with the element 36 to cause the element 36 to pop up with respect to the base 22 indicating that it was the operator interface button 28 which was depressed. Upon depression of the element 36, it interacts with the end 102 of the arm 100, causing clockwise rotation of the control member 54 to reset the control member 54 in a neutral position.

Depression of operator interface button 30 causes it to interact with wedge-shaped surface 128, rotating control member 54 clockwise which concurrently causes the end 104 of arm 100 to interact with the element 38, causing it to pop up. When this happens, and with the previous counterclockwise rotation of the control member 54, the slots 112, 120, 126 and 118 become misaligned underneath the respective tabs 106 on the operator interface buttons 26, 28, 30 and 32, thus preventing depression of operator interface buttons 26, 30 and 32 when operator interface button 28 was first depressed and preventing depression of operator interface buttons 26, 28 and 32 when operator interface button 30 was originally depressed. The depression of the respective buttons is prevented because of the presence of the flange 134 in the spaces not located by the slots 112, 120, 126 and 118 as indicated.

It is apparent from the above discussion that any one of operator interface buttons 26, 28, 30 or 32 is depressed, it will rotate one of the control members 54 and 56 in either a clockwise or counterclockwise manner, and simultaneously cause the element 34, 36, 38 or 40 associated with it to pop up to indicate which of the operator interface buttons, in fact, resulted in rotation of one of the control elements 54 or 56. Upon resetting of the toy 20, by depressing the raised element 34, 36, 38 or 40 as the case may be, the appropriate control member 54 or 56 is rotated in its opposite direction, resetting the toy 20 so once again all of the operator interface buttons 26, 28, 30 and 32 are in an activated state and once again one of them can be depressed to cause rotation of one of the control members 54 or 56.

The control member 54 has an arm 136 located thereon, which includes two small upstanding tabs 138 and 140. Likewise, the control member 56 has an arm 142 which has two tabs 144 and 146 located thereon. Referring to FIGS. 10a and 10b, it can be seen that when both of the control members 54 and 56 are in their neutral position, the tabs 138, 140, 144 and 146 are spaced away from each other such that, generally, a rectangular area is formed between the tabs. If either of the control members 54 or 56 are rotated clockwise or counterclockwise with respect to the other, the tabs 138, 140, 144 and 146 become misaligned with each other such that a triangular arrangement such as that illustrated in FIG. 10b is formed and the area between the tabs is reduced.

Figures 11, 12:
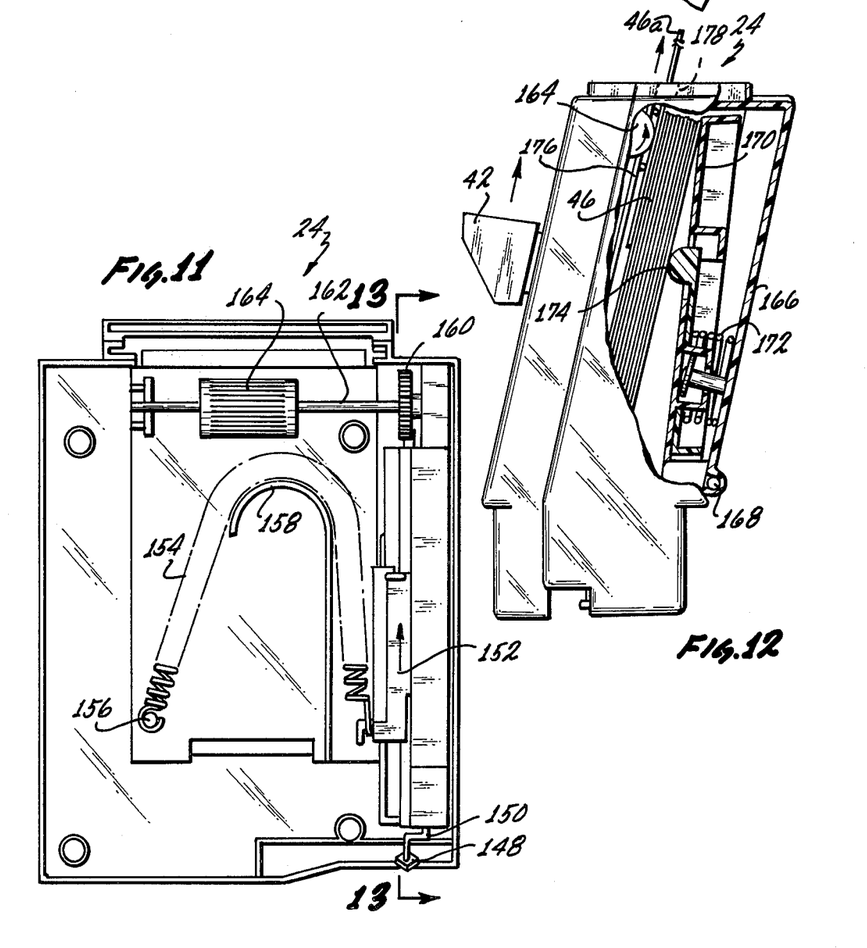
FIG. 11 is a front elevational view of the uppermost component as seen in FIG. 1 with the front housing of that component removed to illustrate details of the construction of underlying components.
FIG. 12 is a side elevational view in partial section of the uppermost component as seen in FIG. 1.

Referring now to FIG. 11, it can be seen that an end 148 of an escapement 150 projects downwardly when the card dispenser 24 is located on the base 22 such that the end 148 is located in the area between the tabs 138, 140, 144 and 146 on the arms 136 and 142. The end 148 of the escapement 150 oscillates back and forth with respect to movement of the escapement 150 as hereinafter described. When the control members 54 and 56 are both in their neutral position and their arms 136 and 142 are aligned as seen in FIG. 10a, the end 148 is free to oscillate back and forth within the space formed between the tabs 138, 140, 144 and 146. When the control members 54 and 56 move with respect to one another, one of the tabs on the control member which has moved with respect to the other one, becomes misaligned with the tabs on the remaining arm, such as tab 146 becoming misaligned with respect to tabs 138 and 140. This then reduces the space in between the tabs such that the end 148 is no longer free to oscillate back and forth and in fact restricted such that the escapement arm 150 no longer can move. This controls the function of the card dispenser 24 as is outlined below.

The card dispenser 24 is illustrated in detail in FIGS. 11, 12, 13 and 14. The activation button 42 is mounted onto a slide member 152. This is connected to one end of a spring 154. The other end of the spring 154 is located on a projection 156 within the card dispenser 24. The spring 154 is pulled over a baffle 158 such that it is bent to somewhat of a "U" shape. The depression of the activation button 42 stretches the spring 154 across the surface of the baffle 158 and the tension thus created within spring 154 biases the sliding member 152 upwardly, which in turn biases the activation button 42 upwardly and also, as hereinafter explained, causes ultimate rotation of a spur gear 160 which is mounted on an axle 162. Also mounted on the axle 162 is a knurled drive drum 164. The drive drum 164 thus rotate in response to movement of the slide member 152 in an upward direction.

As seen in FIG. 12, a plurality of cards, collectively identified by the numeral 46 can be located within the interior of the card dispenser 24. Back 166 of the card dispenser 24 is hinged to the card dispenser 24 about axle 168. An interior member 170 is biased forward from the back 166 by compression spring 172. The members 170, including a tab 174 located thereon pushes against the cards 46, biasing them toward a plate 176 through which the drive drum 164 extends. As seen in FIG. 12 the drive drum 164 rotates counterclockwise allowing the card 46a which is directly abutted against it to move upwardly out of a slot 178 in the top of the card dispenser 24.

The slide member 152 includes a gear rack 180 formed thereon. Gear rack 180 meshes with pinion 182 on a swing gear 184. Also located on swing gear 184 is a spur gear 186. Downward movement of the slide member 152 swings the swing gear 184 outwardly, as is illustrated in phantom lines in FIG. 14, such that the pinion 182 is not rotated by the gear rack 180. Upward movement, however, of the slide member 152 engages the pinion 182 against the gear rack 180 and rotates the swing gear 184 with respect to movement of the gear rack 180 in an upward direction. This upward movement of the gear rack 180 is under the bias of the spring 154 as previously explained, which moves the slide member 152 upwardly.

Figures 13, 14:
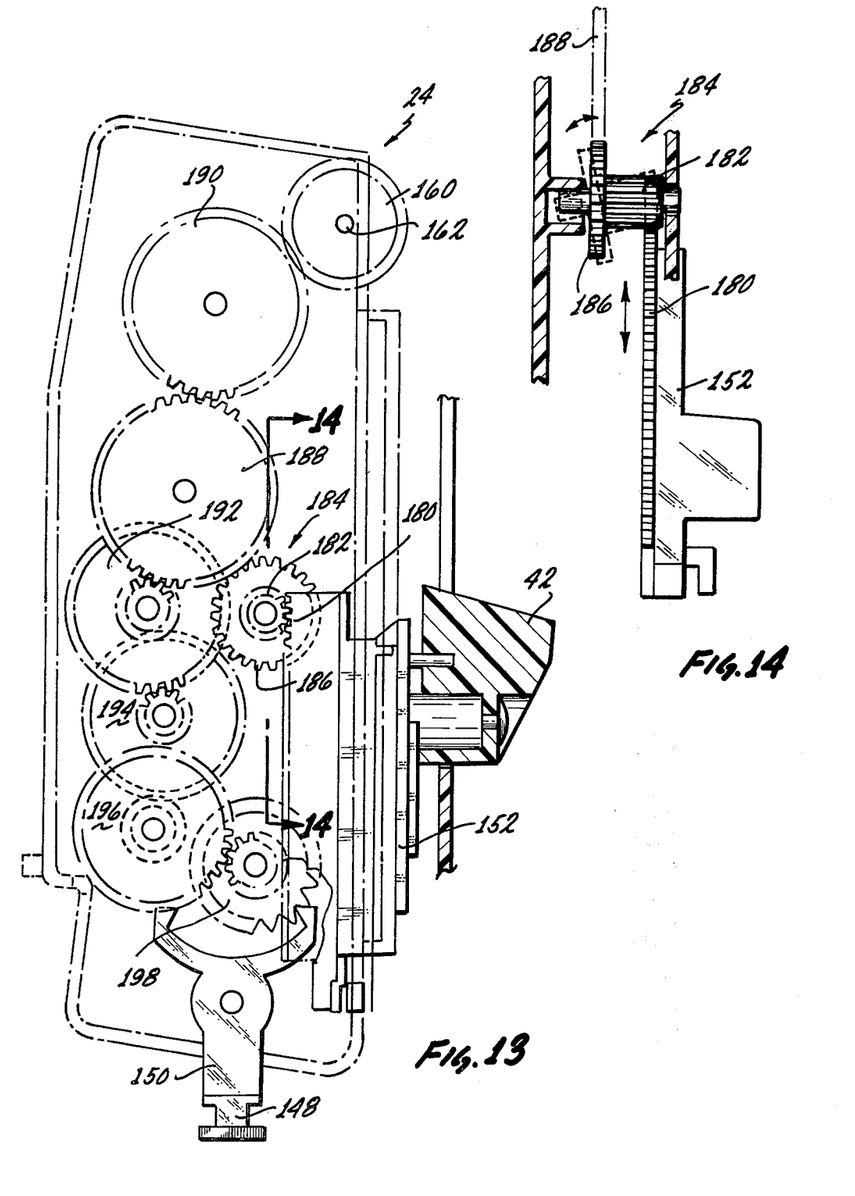
FIG. 13 is a side elevational view about the line 13—13 of FIG. 11.
FIG. 14 is an elevation view in partial section about the line 14—14 of FIG. 13.

Spur gear 186 engages with gear 188 when the spring gear 184 is as seen in solid lines in FIG. 14. When the swing gear 184 is as seen in phantom lines in FIG. 14, the spur gear disengages with gear 188 and does not rotate the same, and as such, the gear 188 does not rotate when the sliding member 182 is being moved downwardly under the influence of downward movement of the activation button 42.

Gear 188 inturn rotate gear 190 which in turn meshes with gear 160 to cause rotation of the drive drum 164. Additionally, gear 188 meshes with gear 192, which in turn meshes with gear 194, which in turn meshes with gear 196, which in turn meshes with escapement gear 198. Escapement gear 198 thus rotates also in response to gear 188.

Rotation of the escapement gear 198 causes oscillation of the escapement 150, which in turn causes movement of its end 148, as previously explained. If the end 148 of the excapement 150 is in fact fixed by being locked within the confines of the tabs 138, 140, 144 and 146, ultimately attached to the control members 54 and 56 as previously explained, this prevents rotation of the escapement gear 198 which in turn prevents rotation of the gears 196, 194, 192, 192 and gear 188. Because gear 188 cannot rotate, the drive drum 164 also cannot rotate, and thus, whenever the end 148 of the escapement 150 is held fast, the rotation of the drive drum 164 is stopped. Furthermore, interaction of the swing gear 184 with the gear 188 also prevents further upward movement of the slide member 152 whenever the escapement 150 is fixedly held. It is evident that ultimate movement of one of the cards 46 upwardly from the card dispenser 24 depends upon the position of the control members 54 and 56 with respect to each other and with respect to the neutral position. Only when both of the control members 54 and 56 are in the neutral position will one of the cards 46 be ejected from the card dispenser 24. With depression of any of the operator interface buttons 26, 28, 30 and 32, one of the control members 54 or 56 is moved, which locks the escapement 150 which in turn stops further ejection of the card 46 from the card dispenser 24. Upon depression of one of the elements 34, 36, 38 or 40, the control members 54 or 56 which was moved from its neutral position is thus relocated back in its neutral position, freeing movement of the escapement 150, and once again allowing for further discharge of the card 46 from the card dispenser 24.

We claim:

1. A toy which comprises:
   a housing;
   at least two operator interface means located on said housing;
   a control means located on said housing in operative association with each of said operator interface means, each of said operator interface means capable of independently interacting with said control means when said control means is in a first control mode and when a first of said operator interface means interacts with said control means said interaction between said first operator interface means and said control means shifting said control means from said first control mode to a second control mode and said shifting of said control means to said second control mode by said interaction with said first operator interface means preventing subsequent interaction between any other interface means with said control means;
   a plurality of indicating means equal in number to the number of said operator interface means, each of said indicating means associated with one of said operator interface means, each indicating means capable of indicating if the operator interface means with which it is associated has interacted with said control means and shifted said control means from said first control mode to said second control mode;
   an inhibitor means operatively associated with said control means and capable of inhibiting said each of said operator interface means from interacting with said control means when said control means is in said second control mode;
   a plurality of reset means equal in number to the number of said operator interface means, each of said reset means operatively associated with said control means and capable of shifting said control means from said second control mode back to said first control mode, each of said reset means associated with one of said operator interface means such that if said operator interface means is said first operator interface means to interact with said control means, and has interacted with said control means the reset means associated with said first operator interface means is capable of shifting said control means from said second control mode back to said first control mode;
   output means associated with said housing and operatively associated with said control means, said output means having a first output parameter and a second output parameter, said output means exhibiting said first output parameter in response to said control means being in said first control mode and said output means exhibiting said second output parameter in response to said control means being in said second control mode;
   a plurality of indicator-reset elements equal in number to the number of said operator interface means, each of said indicator-reset elements associated with one of said operator interface means, each of said indicator-reset elements comprising a functional portion of the one of said reset means and one of said indicating means which are also associated with the operator interface means with which the particular indicator-reset element is associated;
   said output means including a drive means and a drive governing means, said drive means capable in a first instance of producing an output and in a second instance of producing no output;
   said governing means operatively associated with both said control means and said drive means such that said drive means produces said output when said control means is in said first control mode and said drive means produces no output when said control means is in said second control mode.

2. The toy of claim 1 including:
at least one output element and an output housing;
said drive means located in association with said output housing, said output element capable of being associated with said output housing and movable with respect to said output housing;
said drive means moving said output element with respect to said output housing in response to said output of said drive means and said output element remaining static with respect to said output housing in response to said no output of said drive means.

3. A toy which comprises:
a housing;
at least two operator interface means located on said housing;
a control means located on said housing in operative association with each of said operator interface means, each of said operator interface means capable of independently interacting with said control means when said control means is in a first control mode and when a first of said operator interface means interacts with said control means said interaction between said first operator interface means and said control means shifting said control means from said first control mode to a second control mode and said shifting of said control means to said second control mode by said interaction with said first operator interface means preventing subsequent interaction between any other interface means with said control means;
reset means operatively associated with said control means and capable of shifting said control means from said second control mode back to said first control mode;
output means associated with said housing and operatively associated with said control means, said output means having a first output parameter and a second output parameter, said output means exhibiting said first output parameter in response to said control means being in said first control mode and said output means exhibiting said second output parameter in response to said control means being in said second control mode;
said output means including a drive means and a drive governing means, said drive means capable in a first instance of producing an output and in a second instance of producing no output;
said governing means operatively associated with both said control means and said drive means such that when said control means is in said first control mode said drive means produces one of said output and said no output and when said control means is in said second control mode said drive means produces the other of said output and said no output.

4. The toy of claim 3 wherein:
said drive means produces said output when said control means is in said first control mode and said drive means produces said no output when said control means is in said second control mode.

5. The toy of claim 4 including:
at least one output element and an output housing;
said drive means located in association with said output housing, said output element capable of being associated with said output housing and movable with respect to said output housing;
said drive means moving said output element with respect to said output housing in response to said output of said drive means and said output element remaining static with respect to said output housing in response to said no output of said drive means.

6. A toy which comprises:
a housing;
at least two operator interface means located on said housing;
a control means located on said housing in operative association with each of said operator interface means, each of said operator interface means capable of independently interacting with said control means when said control means is in a first control mode and when a first of said operator interface means interacts with said control means said interaction between said first operator interface means and said control means shifting said control means from said first control mode to a second control mode and said shifting of said control means to said second control mode by said interaction with said first operator interface means preventing subsequent interaction between any other interface means with said control means;
reset means operatively associated with said control means and capable of shifting said control means from said second control mode back to said first control mode;
output means associated with said housing and operatively associated with said control means, said output means having a first output parameter and a second output parameter, said output means exhibiting said first output parameter in response to said control means being in said first control mode and said output means exhibiting said second output parameter in response to said control means being in said second control mode;
said control means including at least a first control member, said first control member movably mounted in said housing to move between a neutral position and a first and second position, said control means being in said first control mode when said first control member is in its neutral position and said control means being in said second control mode when said first control member is in its first and second positions;
at least a first and a second operator interface means capable of interacting with said first control member when said first control member is in its neutral position, interaction of said first operator interface means with said first control member moving said first control member to its first position and interaction of said second operator interface means with said first control member moving said first control member to its second position, said first operator interface means incapable of interacting with said first control member when said first control member is in its second position and said second operator interface means incapable of interacting with said first control member when said first control member is is its first position;
said reset means operatively associated with said first control member and capable of shifting said first control member from its first and its second position to its neutral position.

7. The toy of claim 6 including:
at least a first and a second indicator element, each of said first and said second indicator elements operatively associated with said first control member, said first indicator element associated with said first operator interface means and said second indicator element associated with said second operator interface means, each of said first and said second indicator elements having an indicating position and a non-indicating position, said first indicator element moving from its non-indicating position to its indicating position in response to said first control member moving from its neutral position to its first position and said second indicator element moving from its non-indicating position to its indicating position in response to said first control member moving from is neutral position to its second position.

8. The toy of claim 7 wherein:
each of said first and said second indicator elements forms a portion of said reset means, movement of said first indicator element from its indicating position to its non-indicating position moving said first control member from its first position to its neutral position and movement of said second indicator element from its indicating position to its non-indicating position moving said first control member from its second position to its neutral position.

9. The toy of claim 8 including:
inhibitor means operatively associated with said first control member and further associatable with said first and said second operator interface means, said inhibitor means inhibiting interaction of said first operator interface means with said first control member when said control member is in said second position and allowing interaction of said first operator interface means with said first control member when said first control member is in its neutral position, said inhibitor means inhibiting interaction of said second operator interface means with said first control member when said first control member is in its first position and allowing interaction of said second operator interface means with said first control member when said control member is in said neutral position.

10. The toy of claim 9 including:
a second control member, a third and a fourth operator interface means and a third and fourth indicator element;
said third and said fourth operator interface means operatively associated with said second control member and said third and said fourth indicator elements associated with said third and said fourth operator interface means respectively, each of said third and said fourth indicator elements having an indicating position and a non-indicating position;
said second control member having a neutral position and a first and second position, said first and said second operator interface means capable of interacting with said first control member and said third and said fourth operator interface means capable of interacting with said second control member when both of said first and said second control members are in their neutral position, interaction of said third operator interface means with said second control member shifting said control member from its neutral position to its first position and interaction of said fourth operator interface means with said second control member shifting said second control member from its neutral position to its second position, said third operator interface means incapable of interacting with said second control member when said second control member is in its second position and said fourth operator interface means incapable of interacting with said second control member when said second control member is in its first position, said first and said second operator interface means incapable of interacting with said first control member when said second control member is in either of its first or its second positions and said third and said fourth operator interface means incapable of interacting with said control member when said first control member is in either of its first or second positions;
said reset means operatively associated with both said first and said second control members and capable of shifting both of said first and said second control member from their respective first or second position to their respective neutral positions;
each of said third and said fourth indicator elements operatively associated with said second control member, said third indicator operatively associated with said third operator interface means and said fourth indicator element operatively associated with said fourth operator interface means, said third indicator element moving from its non-indicating position to its indicating position in response to said second control member moving from its neutral position to its first position and said fourth indicating element moving from its non-indicating position to its indicating position in response to said second control member moving from its neutral position to its second position;
each of said third and said fourth indicator elements forming a portion of said reset means, movement of said third indicator element from its indicating position to its non-indicating position moving said second control member from its first position to its neutral position and movement of said fourth indicator element from its indicating position to its non-indicating position moving said second control member from its second position to its neutral position.

11. The toy of claim 10 including:
said inhibitor means operatively associated with both said first and said second control members and further associatable with all of said first, said second, said third and said fourth operator interface means;
said inhibitor means inhibiting said first and said second operator interface means from interacting with said first control member and said third and said fourth operator interface means from interacting with said second control member whenever one of either of said first or said second control members are in a position other than their respective neutral positions.

* * * * *

UNITED STATES PATENT AND TRADEMARK OFFICE
CERTIFICATE OF CORRECTION

PATENT NO. : 4,444,391
DATED : April 24, 1984
INVENTOR(S) : Takashi Kaga and Yoshiaki Funakoshi It is certified that error appears in the above-identified patent and that said Letters Patent is hereby corrected as shown below:

Column 4, Line 28, "36 38" should be --33,38--.
Column 5, line 22, "componensts" should be --components--.
Column 5, line 26, "26 28, 30" should be --26, 28, 30--.
Column 6, line 19, "34, 36 38" should be --34, 36, 38--.
Column 6, line 29, "located" should be --locates--.
Column 7, line 15, "torotation" should be --to rotation--.
Column 7, line 17, "tha" should be --the--.
Column 9, line 29, "112" should be --122--.
Column 10, line 55, "rotate" should be --rotates--.
Column 11, line 25, "inturn" should read --in turn--, and "rotate" should be --rotates--.
Column 11, line 40, the second occurrence of the number "192" should be --190--.
Column 11, line 59, "members" should be --member--.

Signed and Sealed this

Twenty-sixth Day of August 1986

[SEAL]

Attest:

DONALD J. QUIGG

Attesting Officer

Commissioner of Patents and Trademarks